United States Patent
Hasegawa

(10) Patent No.: US 7,575,348 B2
(45) Date of Patent: Aug. 18, 2009

(54) VEHICLE HEADLAMP DEVICE

(75) Inventor: Junichi Hasegawa, Kariya (JP)

(73) Assignee: Denso Corporation, Kariya (JP)

( * ) Notice: Subject to any disclaimer, the term of this patent is extended or adjusted under 35 U.S.C. 154(b) by 365 days.

(21) Appl. No.: 11/784,660

(22) Filed: Apr. 9, 2007

(65) Prior Publication Data

US 2007/0253210 A1 Nov. 1, 2007

(30) Foreign Application Priority Data

Apr. 26, 2006 (JP) ............... 2006-122207

(51) Int. Cl.
 *B60Q 1/00* (2006.01)
(52) U.S. Cl. .................... 362/466; 362/464
(58) Field of Classification Search ............ 362/37, 362/464, 466, 507
See application file for complete search history.

(56) References Cited

U.S. PATENT DOCUMENTS

| | | | |
|---|---|---|---|
| 5,837,994 A | 11/1998 | Stam et al. | |
| 5,990,469 A | 11/1999 | Bechtel et al. | |
| 6,255,639 B1 | 7/2001 | Stam et al. | |
| 6,343,869 B1 * | 2/2002 | Kobayashi | 362/37 |
| 6,469,739 B1 | 10/2002 | Bechtel et al. | |
| 6,587,573 B1 | 7/2003 | Stam et al. | |
| 6,611,610 B1 | 8/2003 | Stam et al. | |
| 6,653,614 B2 | 11/2003 | Stam et al. | |
| 6,728,393 B2 | 4/2004 | Stam et al. | |
| 6,919,548 B2 | 7/2005 | Stam et al. | |
| 6,960,005 B2 * | 11/2005 | Daicho et al. | 362/466 |
| 2003/0058346 A1 | 3/2003 | Bechtel et al. | |
| 2003/0123705 A1 | 7/2003 | Stam et al. | |
| 2003/0123706 A1 | 7/2003 | Stam et al. | |
| 2003/0137849 A1 * | 7/2003 | Alden | 362/466 |
| 2003/0138132 A1 | 7/2003 | Stam et al. | |
| 2005/0242740 A1 | 11/2005 | Stam et al. | |
| 2006/0018512 A1 | 1/2006 | Stam et al. | |
| 2006/0091813 A1 | 5/2006 | Stam et al. | |
| 2006/0177098 A1 | 8/2006 | Stam | |

FOREIGN PATENT DOCUMENTS

JP 07-108873 4/1995

* cited by examiner

*Primary Examiner*—Laura Tso
(74) *Attorney, Agent, or Firm*—Harness, Dickey & Pierce, PLC

(57) ABSTRACT

A vehicle headlamp device that includes a forward vehicle detecting device and a projection state changing device for switching a projection state of the headlamp between a first and second projection state. The device also includes a specific state determining device that determines whether a specific state exists in which switching between the first and second projection states should be prohibited. The projection state changing device maintains the headlamp in a current state of projection when the specific state determining device determines that the specific state exists.

10 Claims, 12 Drawing Sheets

\# VEHICLE HEADLAMP DEVICE

CROSS REFERENCE TO RELATED APPLICATION

The following is based on and claims priority to Japanese Patent Application No. 2006-122207, filed Apr. 26, 2006, which is hereby incorporated by reference in its entirety.

FIELD

The following relates to a vehicle headlamp device and in particular to a vehicle headlamp device that detects the presence or absence of a forward vehicle and automatically changes the projection state of the headlamps accordingly.

BACKGROUND

Vehicle headlamp systems have been proposed that detect the presence of a forward vehicle (i.e., a vehicle positioned ahead of the reference vehicle). In one such system, a light source in of the forward vehicle, such as a tail lamp of a preceding vehicle or a headlamp of an oncoming vehicle is detected with an imaging sensor or the like. When no forward vehicle is detected, the state of projection of light from the headlamps of the reference vehicle is automatically changed from low beam to high beam. Thus, the driver's view of the road can be improved. (Refer to JP-A-2001-519744T and JP-7-108873A, for example.)

However, these systems suffer from certain disadvantages. When the reference vehicle turns to the left or right, a light source, such as a tail lamp of the preceding vehicle or a headlamp of an oncoming vehicle may move out of the range of detection of the imaging sensor or the like. As a result, the projection state of the headlamps is changed from low beam to high beam. Then, if the reference vehicle turns in the same direction toward the forward vehicle, switching back from high beam to low beam is carried out. As a result, the driver of the reference vehicle may be erroneously perceived to be flashing his/her lights by the driver of the forward vehicle. Furthermore, when the forward vehicle enters a curve or the reference vehicle is moving through a curve, the tail lamps of the forward vehicle enter within and move out of the range of detection of the imaging sensor or the like. For this reason, repeated switching from low beam to high beam and from high beam to low beam may occur. As a result, the driver of the reference vehicle may be erroneously perceived to be flashing his/her lights by the driver of the forward vehicle.

SUMMARY

A vehicle headlamp device for a reference vehicle with a headlamp is disclosed. The device includes a forward vehicle detecting device for detecting the presence of a forward vehicle and a projection state changing device for switching a projection state of the headlamp between a first projection state and a second projection state. The headlamp projects a greater amount of light in the second projection state than in the first projection state, and the projection state changing device switches the headlamp to the first projection state when the forward vehicle detecting device detects the presence of the forward vehicle. The projection state changing device switches the headlamp to the second projection state when the forward vehicle detecting device detects an absence of the forward vehicle. The vehicle headlamp device also includes a specific state determining device that determines whether a specific state exists in which switching between the first and second projection states should be prohibited. The projection state changing device maintains the headlamp in a current state of projection when the specific state determining device determines that the specific state exists.

DETAILED DESCRIPTION OF EMBODIMENTS

Figure 1:
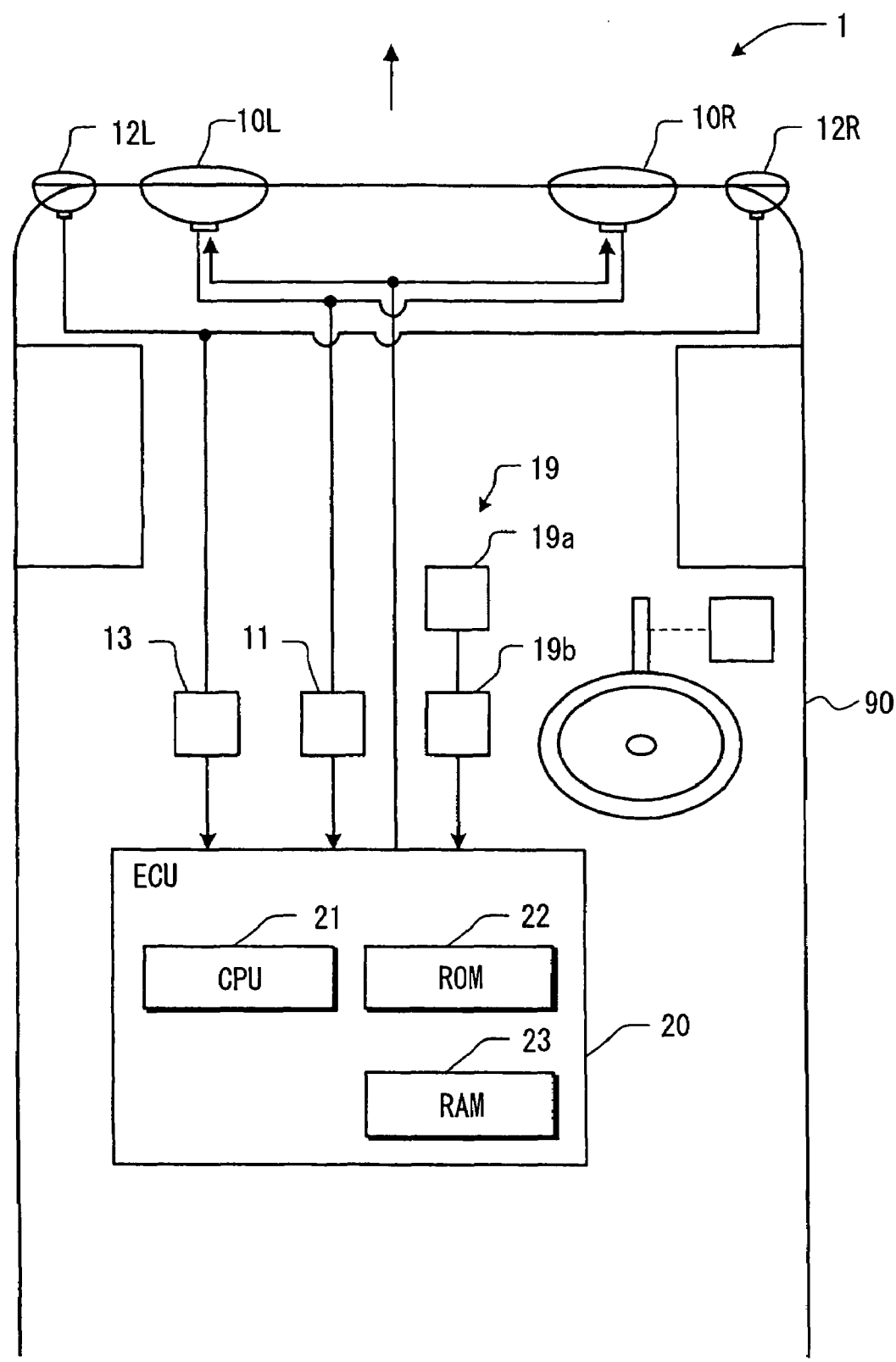
FIG. 1 is a block diagram illustrating the system configuration of a vehicle headlamp device in a first embodiment.

Hereafter, description will be given to various embodiments in which a vehicle headlamp device is described with reference to the drawings. As illustrated in FIG. 1, the vehicle headlamp device 1 for the reference vehicle 90 includes headlamps 10L, 10R, a headlamp switch 11, a turn signal lamp switch 13, an imaging sensor 19, and an ECU 20. The vehicle headlamp device 1 further includes left and right turn signal lamps 12L, 12R that indicate that the vehicle is turning (e.g., by flashing, etc.).

The headlamps 10L, 10R are disposed on the left and right on the front face of a vehicle. In one embodiment, each of the headlamps 10L, 10R is a publicly know headlamp including a reflector, a lens, and two filaments, one for low beam and the other for high beam setting. The filament for low beam is positioned slightly above the focal point of the reflector, and the filament for high beam is positioned in the focal point of the reflector. The headlamps are so constructed that they can be switched between low beam state and high beam state. In the low beam state, only the filaments for low beam are turned on. In the high beam state, both the filaments for low beam and for high beam are turned on and a greater amount of light is projected from the headlamps 10L, 10R as compared to the low beam state. The low beam state corresponds to a first state of projection, and the high beam state corresponds to a second state of projection.

The headlamp switch 11 is a switch for outputting electrical signals that indicate the state of the headlamps 10L, 10R. Specifically, the headlamp switch 11 outputs a "low beam on" signal that indicates that the headlamps 10L, 10R are in the low beam state and a "high beam on" signal that indicates that they are in the high beam state.

The turn signal lamp switch 13 is a switch for outputting electrical signals that indicate the operating state of the left and right turn signal lamps 12L, 12R. Specifically, the turn signal lamp switch 13 outputs a left on signal that indicates that the left turn signal lamp 12L is on and a right on signal that indicates that the right turn signal lamp 12R is on.

The imaging sensor 19 is a device that detects the presence or absence of a vehicle (referred to as forward vehicle 91) ahead of the reference vehicle 90, such as a preceding vehicle and/or an oncoming vehicle. The imaging sensor 19 also detects the side position of the forward vehicle 91 relative to the reference vehicle 90. In other words, the imaging sensor 19 can detect if the forward vehicle 91 is positioned to the right or left of the reference vehicle 90. The imaging sensor 19 also outputs a signal indicating the result of detection. The imaging sensor 19 constitutes the forward vehicle detecting device in this embodiment.

The imaging sensor 19 is constructed of an image pickup unit 19a and an image processing unit 19b. The image pickup unit 19a is constructed of, for example, a CCD element, and is disposed at the front part of the vehicle to pick up an image of the area ahead of the reference vehicle 90. The image processing unit 19b processes and recognizes an image of the area ahead picked up by the image pickup unit 19a, and outputs a signal indicating the result of recognition. Specifically, the image processing unit 19b recognizes a light source of a forward vehicle 91 (a tail lamp of the preceding vehicle, a headlamp of an oncoming vehicle, etc.) in an image of the area ahead. When the image processing unit 19b recognizes the presence of a light source in the image of the area ahead, it outputs a light source present signal. When the image processing unit 19b does not recognize the presence of a light source in the image of the area ahead, it outputs a light source absent signal. In this embodiment, the presence of a forward vehicle 91 is represented by a light source present signal, and the absence of a forward vehicle 91 is represented by a light source absent signal.

The ECU (Electronic Control Unit) 20 is constructed of a CPU 21 as a central processor that carries out various publicly known computations, ROM 22 that stores a control program, RAM 23 that stores varied data, and the like. The ECU 20 is constructed as a control circuit for controlling the state of beams from the headlamps 10L, 10R (i.e., the state of projection). As illustrated in FIG. 1, the ECU 20 is inputted with output signals from the headlamp switch 11, turn signal lamp switch 13, and imaging sensor 19. The ECU 20 executes the beam state change processing program, described later, and constitutes a projection state changing device, a specific state determining device, and the detection result storing device.

Description will be given to the flow of the beam state change processing carried out by the CPU 21 in the ECU 20 with reference to the flowchart in FIG. 2. The beam state change processing program in which the contents of the flowchart in FIG. 2 are described is stored in the ROM 22, and the CPU 21 reads this program from the ROM 22 and executes it at certain time intervals.

Figure 2:
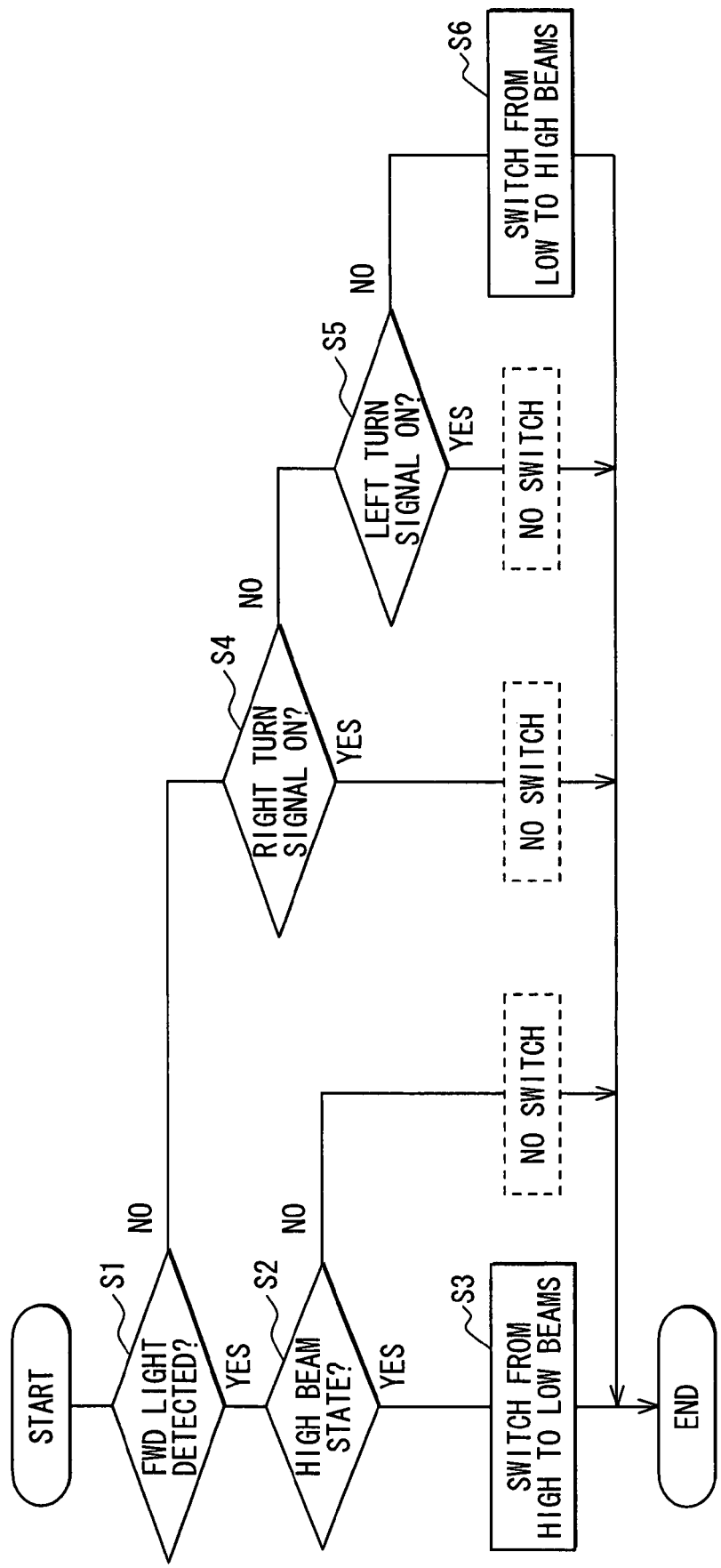
FIG. 2 is a flowchart illustrating the process flow of the beam state change processing in the vehicle headlamp device of the first embodiment.

In the processing illustrated by the flowchart in FIG. 2, first, it is determined based on a signal from the imaging sensor 19 whether or not a light source exists ahead of the reference vehicle 90 (Step 1). (Step 1 will be hereafter abbreviated as S1 as will the other steps.) When there is the input of a light source present signal, that is, a forward light source exists (S1: Yes), it is determined based on a signal from the headlamp switch 11 whether or not the state of beams from the headlamps 10L, 10R is high beam (S2). When there is the input of a "high beam on" signal, that is, the headlamps are in the high beam state (S2: Yes), a beam switching signal for changing the beam state to the low beam state beam is outputted to the headlamps 10L, 10R (S3), and this routine is terminated. Thus, the state of beams from the headlamps 10L, 10R is changed from the high beam state to the low beam state.

When it is determined at S2 that there is the input of a "low beam on" signal, that is, the headlamps are not in the high beam state (S2: No), this routine is terminated without outputting a beam switching signal (as represented by a box with broken border lines in FIG. 2), and the low beam state that is the present state of beam is maintained.

When it is determined at S1 that there is the input of a light source absent signal, that is, a forward light source does not exist (S1: No), it is determined based on a signal from the turn signal lamp switch 13 whether or not the right turn signal lamp 12R is on (S4). When there is the input of a "right on" signal, that is, the right turn signal lamp 12R is on (S4: Yes), this routine is terminated without outputting a beam switching signal. In this case, the present state of beam is maintained (as represented by a box with broken border lines in FIG. 2).

When it is determined at S4 that there is no input of a right on signal, that is, the right turn signal lamp 12R is not on (S4: No), it is determined based on a signal from the turn signal lamp switch 13 whether or not the left turn signal lamp 12L is on (S5). When there is the input of a "left on" signal, that is, the left turn signal lamp 12L is on (S5: Yes), this routine is terminated without outputting a beam switching signal. In this case, the present state of beam is maintained (as represented by a box with broken border lines in FIG. 2).

When it is determined at S5 that there is no input of a "left on" signal, that is, the left turn signal lamp 12L is not on (S5: No), a beam switching signal for changing the beam state to the high beam state is outputted to the headlamps 10L, 10R (S6), and this routine is terminated. Thus, the state of beams from the headlamps 10L, 10R is changed from the low beam state to the high beam state.

When the determination at S4 in the flowchart in FIG. 2 is "Yes" and/or when the determination at S5 is "Yes," it is determined that a specific state exists in which switching from the low to high beam state should be prohibited. In other words, when S4 and/or S5 is answered affirmatively, the ECU 20 determines that the vehicle is turning, and as a result, the headlamps 10L, 10R should not be switched from low to high beam states even though there is no detected forward vehicle 91.

Thus, as is apparent from the above detailed description, when the absence of a forward vehicle 91 is detected by the imaging sensor 19, the CPU 21 determines whether or not the present state is the specific state in which change of the projection state of light from the headlamps 10L, 10R should be prohibited. When it is determined that the present state is the specific state, the headlamps 10L, 10R are kept in the present state of projection. Therefore, it is possible to prevent unnecessary change of the state of beam (the projection state) to avoid distracting the driver of the forward vehicle 91.

More specific description will be given. When it is detected based on a signal from the turn signal lamp switch 13 that the turn signal lamp 12L, 12R is on (S4: Yes, S5: Yes), the CPU 21 maintains the headlamps 10L, 10R in the present state of projection. Therefore, even when a light source, such as a tail lamp of the forward vehicle 91, temporarily moves out of the range of detection of the imaging sensor 19 because the reference vehicle 90 turns to the left or right, as illustrated in the bird's-eye view in FIG. 11, it is possible to avoid unnecessary change of the state of headlamps 10L, 10R from low to high beam projection state. Thus, distraction of the driver of the forward vehicle 91 is less likely.

Figure 3:
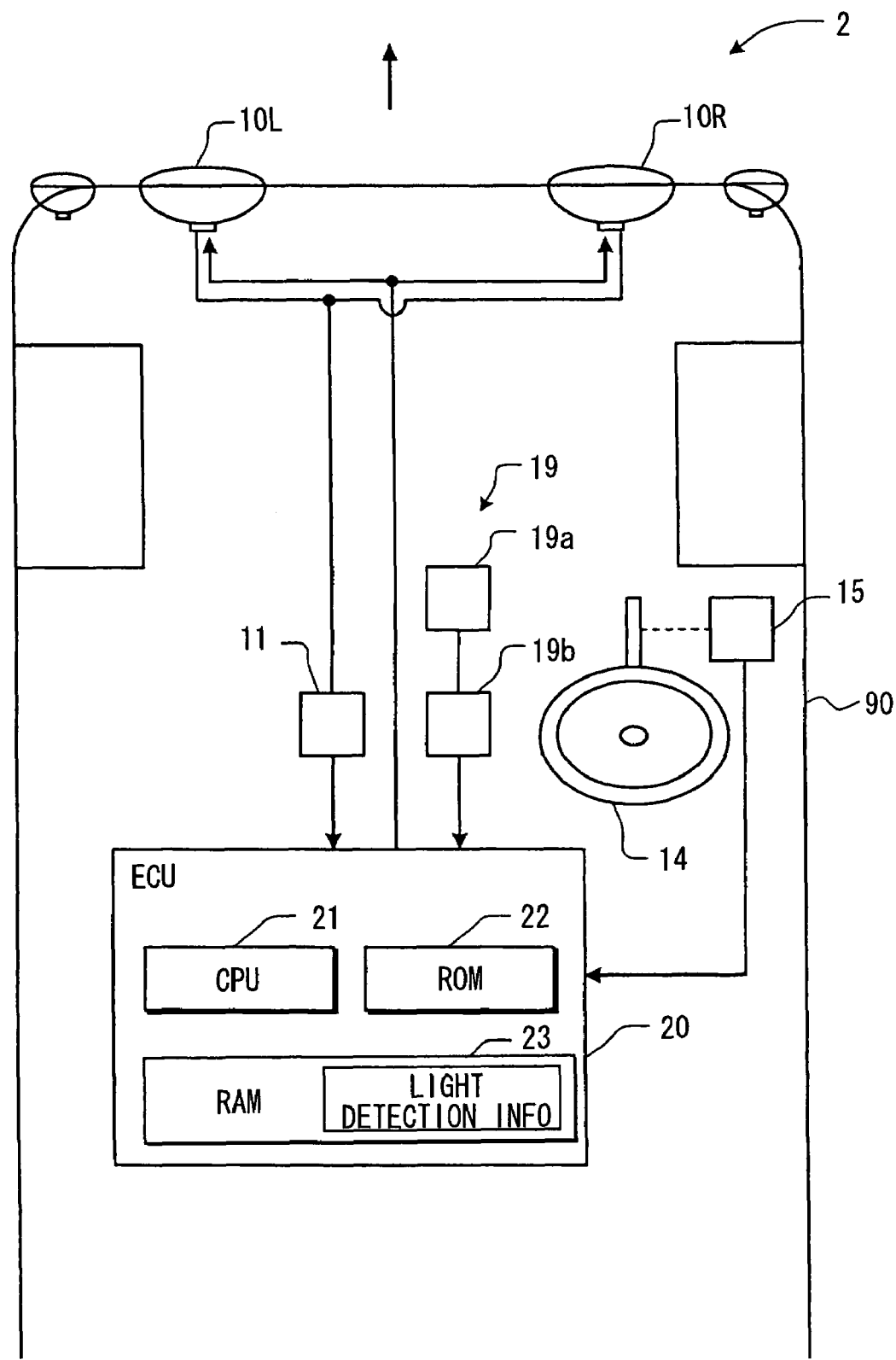
FIG. 3 is a block diagram illustrating the system configuration of a vehicle headlamp device in a second embodiment.
Figure 4:
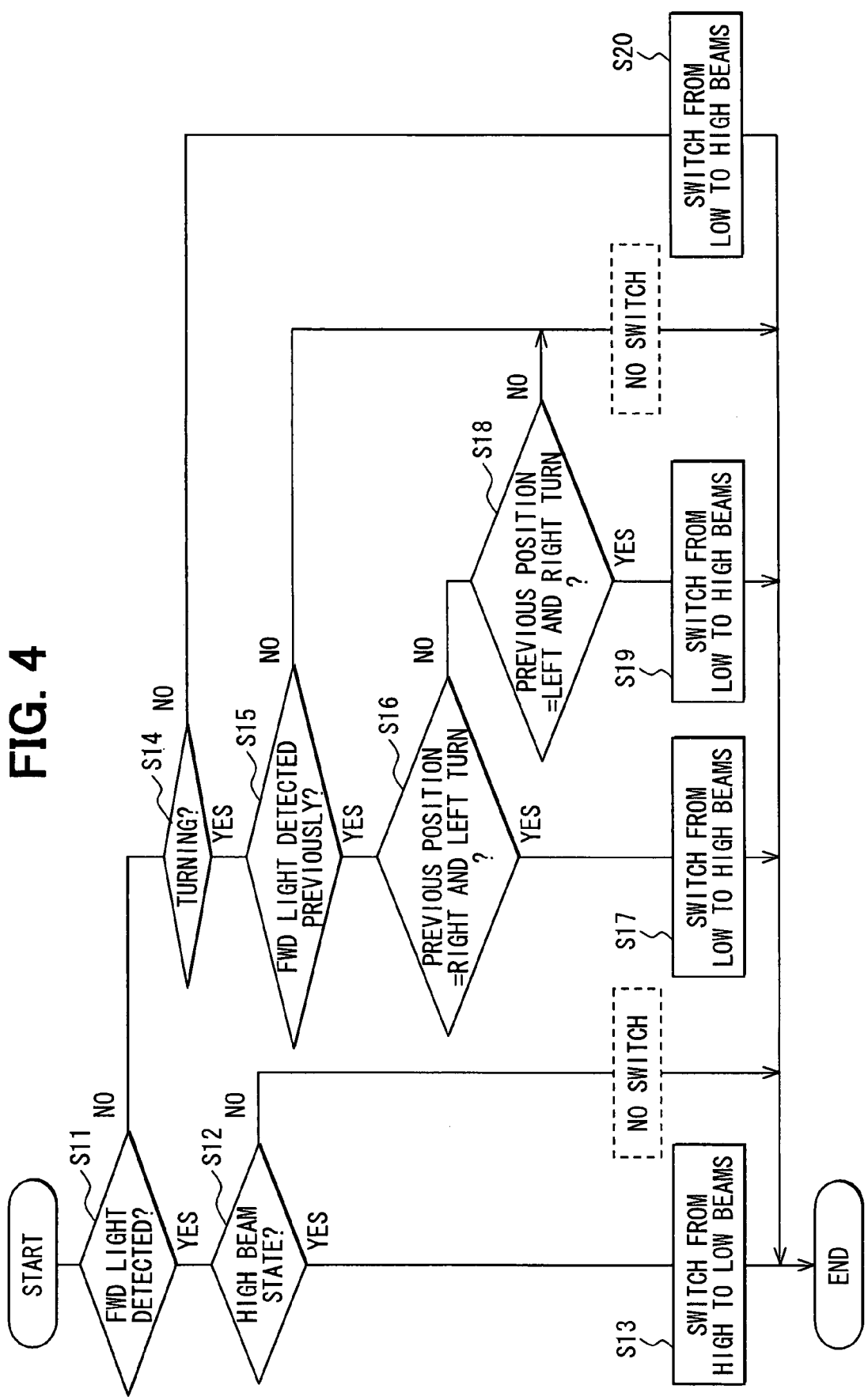
FIG. 4 is a flowchart illustrating the process flow of the beam state change processing in the vehicle headlamp device of the second embodiment.

Description will be given to a second embodiment of the invention with reference to FIG. 3 and FIG. 4. FIG. 3 is a block diagram illustrating the system configuration of a vehicle headlamp device 2 in the second embodiment. FIG. 4 is a flowchart illustrating the flow of the beam state change processing in the vehicle headlamp device 2. Components that are similar to those of the first embodiment are identified with corresponding reference numerals, but redundant description thereof is omitted. The first embodiment is so constructed that the headlamps 10L, 10R are kept in the present state of beam when the turn signal lamp 12L, 12R is on. The second embodiment is so constructed that the headlamps 10L, 10R are kept in the present projection state when it is detected that the reference vehicle 90 is turning.

As illustrated in FIG. 3, the ECU 20 of the vehicle headlamp device 2 is inputted with output signals from the headlamp switch 11, steering angle sensor 15, and imaging sensor 19. The steering angle sensor 15 is a publicly known sensor that detects the operation angle of a steering wheel 14, and outputs the result of detection as a steering angle signal. The imaging sensor 19 outputs the "light source present" signal and "light source absent" signal similar to the first embodiment. In addition, the imaging sensor 19 detects the position of the forward vehicle 91 relative to the reference vehicle 90. For instance, when the image processing unit 19b recognizes a light source in the right half portion of an image of the area ahead, it outputs a "right forward signal" that indicates that a forward vehicle 91 is positioned ahead on the right relative to the position of the reference vehicle 90. Furthermore, when the image processing unit 19b recognizes a light source in the left half portion of an image of the area ahead, it outputs a "left forward signal" that indicates that a forward vehicle 91 is positioned ahead on the left. The CPU 21 of the ECU 20 stores light source detection information in the RAM 23 each time a "light source present signal," "light source absent signal," "right forward signal," or "left forward signal" is inputted from the imaging sensor 19. The light source detection information stored in the RAM 23 includes information related to forward light source present/absent and light source position right forward/left forward.

Description will be given to the details of the beam state change processing carried out by the CPU 21 in the ECU 20 with reference to the flowchart in FIG. 4.

The steps from S11 to S13 in the flowchart in FIG. 4 are the same as the steps from S1 to S3 in the flowchart in FIG. 2; therefore, the description of them will be omitted. When it is determined at S11 that there is the input of a light source absent signal, that is, a light source does not exist ahead (S11: No), it is determined based on a signal from the steering angle sensor 15 whether or not the reference vehicle 90 is turning (S14). More specifically, in one embodiment, when the absolute value of a steering angle indicated by a steering angle signal is equal to or higher than a predetermined value, it is determined that the reference vehicle 90 is turning. Also, when the absolute value is lower than the predetermined value, it is determined that the reference vehicle 90 is not turning.

When it is determined that the reference vehicle 90 is turning (S14: Yes), it is determined whether or not a light source existed ahead of the reference vehicle 90 at the previous time (S15). This determination is carried out based on the previous forward light source information stored in the RAM 23.

When a light source existed ahead at the previous time (S15: Yes), it is determined whether the previous light source position is right forward, and whether the reference vehicle 90 is turning to the left (S16). This determination is carried out based on the previous light source position information stored in the RAM 23 and a steering angle signal. When the previous light source position is right forward and the reference vehicle 90 is turning to the left (S16: Yes), a beam switching signal for changing the beam state to the high beam state is outputted to the headlamps 10L, 10R (S17), and the projection state of the headlamps 10L, 10R is changed from the low beam state to the high beam state. Then, this routine is terminated.

When it is determined at S16 that the previous light source position is not right forward or the reference vehicle 90 is not turning to the left (S16: No), it is determined whether or not the previous light source position is left forward and the reference vehicle 90 is turning to the right (S18). This determination is carried out based on the previous light source position information stored in the RAM 23 and a steering angle signal. When it is determined that the previous light source position is left forward and the reference vehicle 90 is turning to the right (S18: Yes), a beam switching signal for changing the beam state to the high beam state is outputted to the headlamps 10L, 10R (S19), and the projection state of the headlamps 10L, 10R is changed from the low beam state to the high beam state. Then, this routine is terminated.

When it is determined at S15 that a light source did not exist ahead at the previous time (S15: No), this routine is terminated without outputting the beam switching signal. Similarly, when it is determined at S18 that the previous light source position is not left forward or the reference vehicle 90 is not turning to the right (S18: No), this routine is terminated without outputting a beam switching signal. In these cases, the low beam state that is the present state of beam is maintained.

When it is determined at S14 that the reference vehicle 90 is not turning (S14: No), a beam switching signal for changing the beam state to the high beam state is outputted to the headlamps 10L, 10R (S20), and this routine is terminated. Thus, the state of beams from the headlamps 10L, 10R is changed from the low beam state to the high beam state.

When the determination at S15 in the flowchart in FIG. 4 is "No" and when the determinations at S16 and at S18 are both "No," that corresponds to the specific state in the invention in which change of the state of projection of light from the headlamps should be prohibited.

According to this embodiment, as is apparent from the above detailed description, when it is detected that the reference vehicle 90 is turning, the CPU 21 keeps the headlamps 10L, 10R in the present projection state. Therefore, the following can be implemented. When the reference vehicle 90 is turning and following the forward vehicle 91 in a curved section of a road, as illustrated in the overhead view in FIG. 12A, a light source, such as a tail lamp of the forward vehicle 91, can temporarily move out of range of detection of the imaging sensor 19. The headlamps 10L, 10R are kept in the present state of projection (S15: No or S18: No) at this time.

Therefore, it is possible to prevent unnecessary change of the projection state of the headlamps 10L, 10R to thereby avoid distraction of the driver of the forward vehicle 91.

Like the first embodiment, the headlamps 10L, 10R are maintained in the present projection state (i.e., low beam state) when the specific state exists. However, in this embodiment, it is determined that the present state is the specific state when the absence of a forward light source is detected, but the presence of a forward vehicle 91 is stored as the previous light source detection information in the RAM 23, and the present turning direction and the side position of the forward vehicle 91 stored as the previous light source detection information in the RAM 23 agree with each other.

Figure 12A:
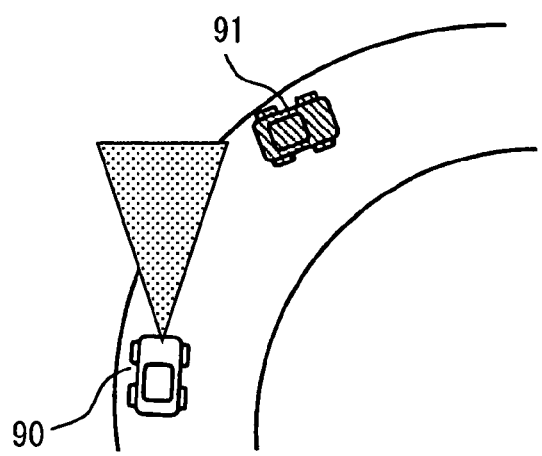
FIG. 12A is an overhead view schematically illustrating a case where the reference vehicle is following the forward vehicle in a right curve.
Figure 12B:
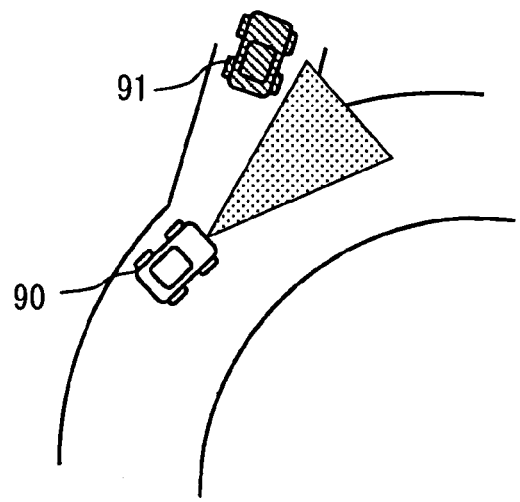
FIG. 12B is an overhead view schematically illustrating a case where the forward vehicle turns to the left at a midpoint in a right curve.

The above processing allows the situations illustrated in FIGS. 12A and 12B to be discriminated from each other. In cases in which the forward vehicle 91 turns to the left or right at a junction and gets out of the range of detection of the imaging sensor 19 (FIG. 12B), the projection state would be changed from low to high beam states. On the other hand, in cases where the forward vehicle 91 running through a curve temporarily moves out of the range of detection of the imaging sensor 19 (FIG. 12A), the projection state would remain in the low beam state. (FIG. 12B illustrates a case where the forward vehicle 91 turns to the left at a junction in a right curve (S18: Yes), and the state of beams from the headlamps 10L, 10R is changed from the low beam state to the high beam state.)

Figure 5:
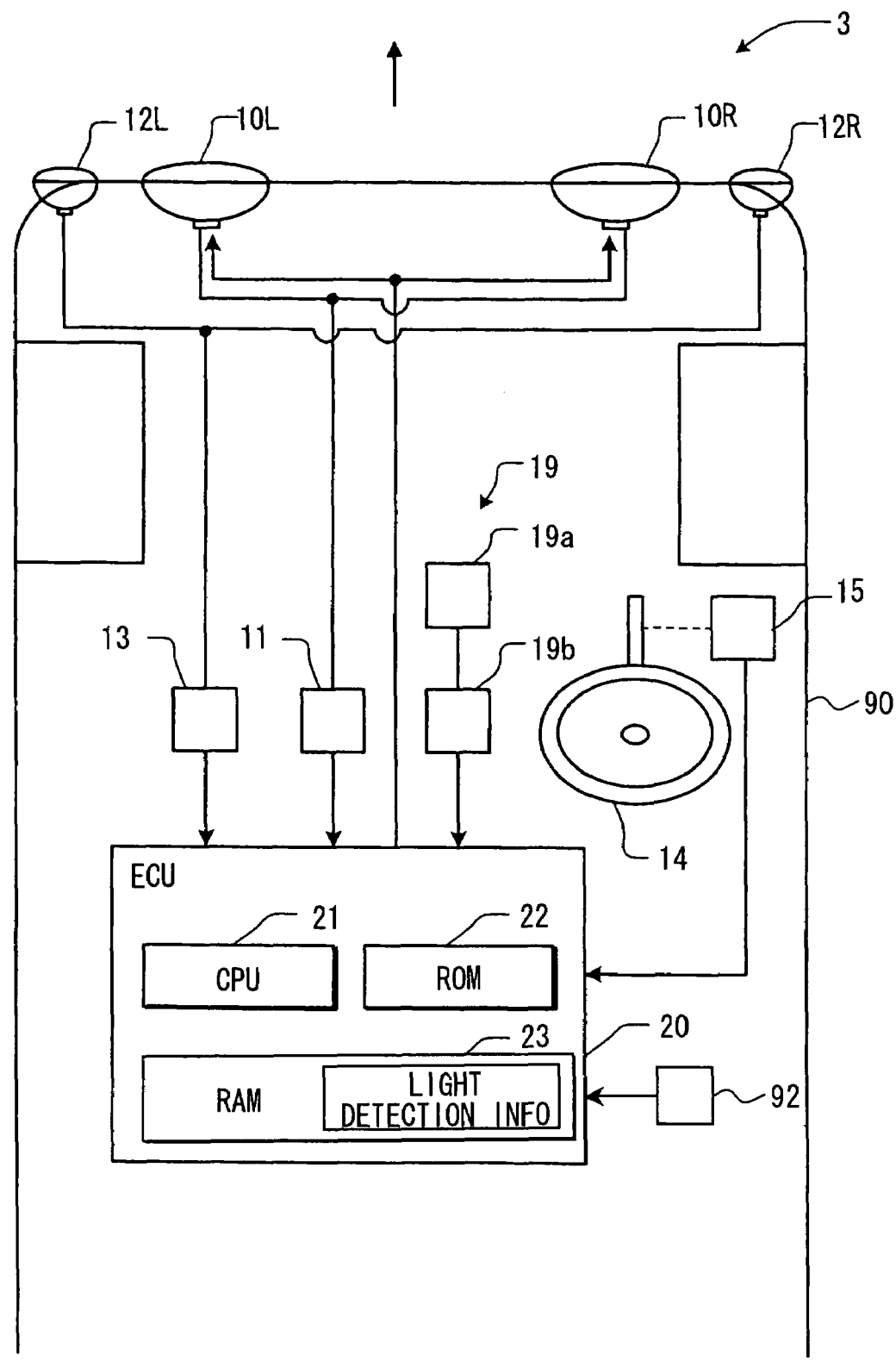
FIG. 5 is a block diagram illustrating the system configuration of a vehicle headlamp device in a third embodiment.
Figure 6:
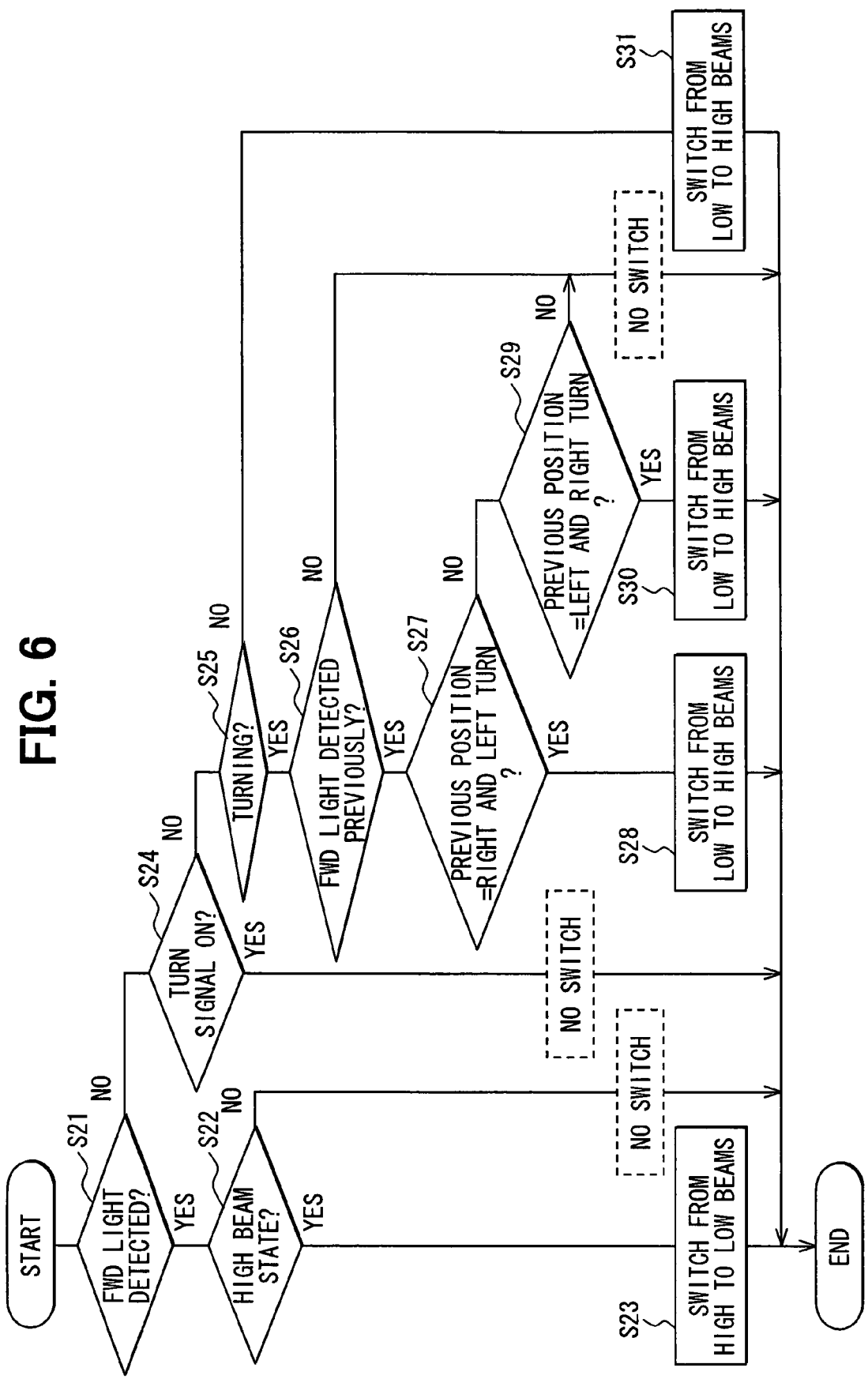
FIG. 6 is a flowchart illustrating the process flow of the beam state change processing in the vehicle headlamp device of the third embodiment.

Description will be given to a third embodiment of the invention with reference to FIG. 5 and FIG. 6. FIG. 5 is a block diagram illustrating the system configuration of a vehicle headlamp device 3 in the third embodiment. FIG. 6 is a flowchart illustrating the flow of the beam state change processing in the vehicle headlamp device 3. This embodiment is so constructed that the state of beam is determined and changed by a combination of the first embodiment and the second embodiment.

As illustrated in FIG. 5, the ECU 20 of the vehicle headlamp device 3 is inputted with output signals from the headlamp switch 11, turn signal lamp switch 13, steering angle sensor 15, and imaging sensor 19.

Description will be given to the details of the beam state change processing carried out by the CPU 21 in the ECU 20 with reference to the flowchart in FIG. 6.

The steps from S21 to S23 in the flowchart in FIG. 6 are the same as the steps from S1 to S3 in the flowchart in FIG. 2; therefore, the description of them will be omitted.

When it is determined at S21 that there is the input of a light source absent signal, that is, a light source does not exist ahead (S21: No), it is determined based on a signal from the turn signal lamp switch 13 whether or not the left turn signal lamp 12L or the right turn signal lamp 12R is on (S24). When it is determined that there is the input of a left on signal or right on signal, that is, the left turn signal lamp 12L or the right turn signal lamp 12R is on (S24: Yes), this routine is terminated without outputting a beam switching signal. In this case, the present state of beam is maintained.

When it is determined at S24 that there is no input of a "left on" signal or a "right on" signal, that is, neither the left turn signal lamp 12L nor the right turn signal lamp 12R is on (S24: No), the flow proceeds to S25. The steps from S25 to S31 are the same as the steps from S14 to S20 in the flowchart in FIG. 4; therefore, the description of them will be omitted.

When the determination at S24 in the flowchart in FIG. 6 is "Yes," when the determination at S26 is "No," and when the determinations at S27 and at S29 are both "No," that corresponds to the specific state in the invention in which change of the state of projection of light from the headlamps should be prohibited.

Figure 11:
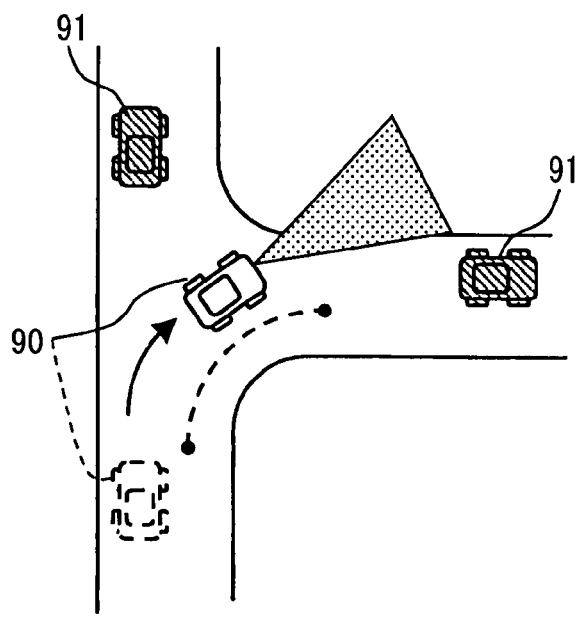
FIG. 11 is an overhead view schematically illustrating a case in which a forward vehicle is positioned in the direction to which the reference vehicle turns at an intersection.

According to this embodiment, as is apparent from the above detailed description, it is possible to prevent unnecessary change of the state of beams from the headlamps 10L, 10R in cases where the reference vehicle 90 turns to the left or right, as illustrated in FIG. 11 and in cases where the reference vehicle 90 turns, following the forward vehicle 91, in a curved section of a road, as illustrated in FIGS. 12A and 12B.

Figure 7:
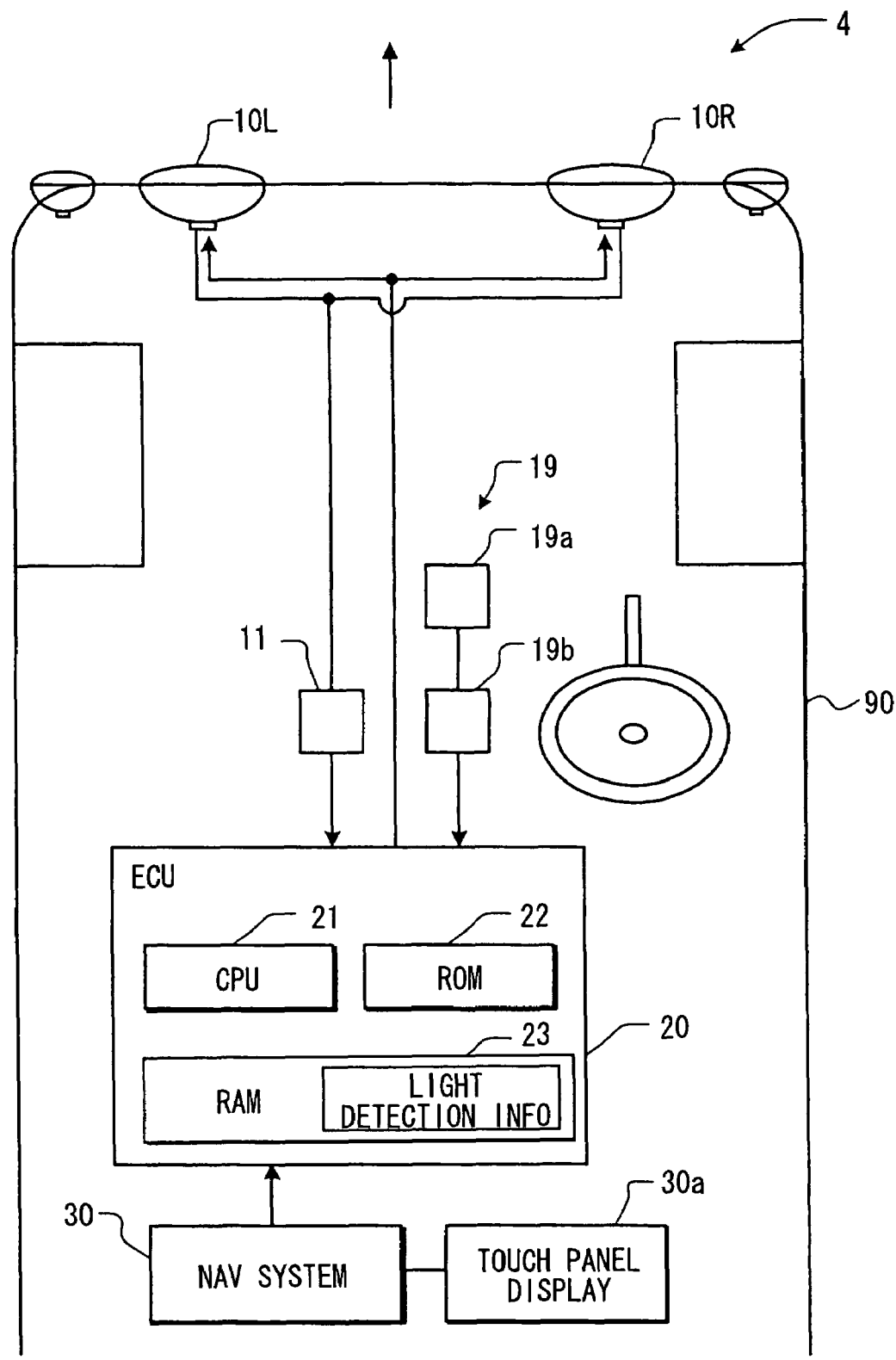
FIG. 7 is a block diagram illustrating the system configuration of a vehicle headlamp device in a fourth embodiment.
Figure 8:
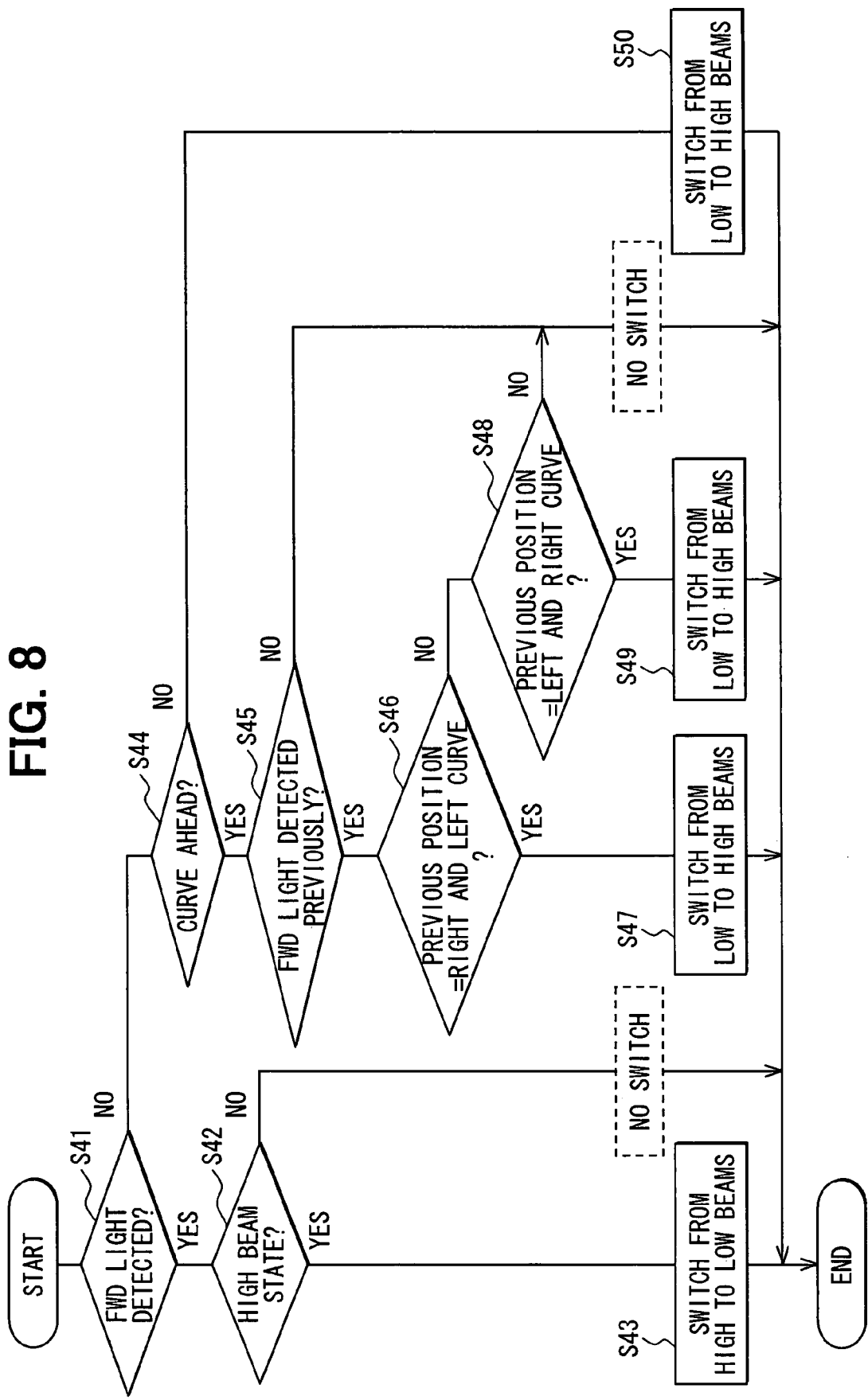
FIG. 8 is a flowchart illustrating the process flow of the beam state change processing in the vehicle headlamp device of the fourth embodiment.

Description will be given to a fourth embodiment of the invention with reference to FIG. 7 and FIG. 8. FIG. 7 is a block diagram illustrating the system configuration of a vehicle headlamp device 4 in the fourth embodiment. FIG. 8 is a flowchart illustrating the flow of the beam state change processing in the vehicle headlamp device 4. The second embodiment is so constructed that the state of beams from the headlamps 10L, 10R is maintained when it is detected based on a steering angle signal outputted from the steering angle sensor 15 that the reference vehicle 90 is turning. The fourth embodiment is so constructed that the state of beam from the headlamps 10L, 10R is maintained when it is detected based on road information outputted from an automobile navigation system 30 that a curve exists ahead.

As illustrated in FIG. 7, the ECU 20 of the vehicle headlamp device 4 is inputted with output signals from the headlamp switch 11, imaging sensor 19, and automobile navigation system 30.

The automobile navigation system 30 includes a storage device, not shown, for storing road information, a touch-panel display 30a placed in a position in the vehicle compartment where it is easily viewable from the driver's seat, and the like. It is so constructed as to estimate the present position of the reference vehicle 90 utilizing GPS (Global Positioning System) and cause the touch-panel display 30a to display a map and the estimated position of the reference vehicle 90. The road information stored in the automobile navigation system 30 includes information related to the positions and lengths of curves. Therefore, the navigation system 30 is capable of detecting a curve existing ahead of the estimated position of the reference vehicle 90 and outputting the information on the curve.

Description will be given to the details of the beam state change processing carried out by the CPU 21 in the ECU 20 with reference to the flowchart in FIG. 8.

The steps from S41 to S43 in the flowchart in FIG. 8 are the same as the steps from S1 to S3 in the flowchart in FIG. 2; therefore, the description of them will be omitted. When it is determined at S41 that there is the input of a light source absent signal, that is, a light source does not exist ahead (S41: No), it is determined whether or not the road is curved ahead of the reference vehicle 90 (S44). This determination is carried out based on road information from the automobile navigation system 30. When it is determined that the road is curved (S44: Yes), it is determined based on the previous forward light source information stored in the RAM 23 whether or not a light source existed ahead at the previous time (S45). When a light source existed ahead at the previous time (S45: Yes), it is determined whether or not the previous light source position is right forward and whether the road is curved to the left (S46). This determination is carried out based on the previous light source position information stored in the RAM 23 and road information from the automobile navigation system 30. When the previous light source position is right forward and the road is curved to the left (S46: Yes), a beam switching signal for changing the beam state to the high beam state is outputted to the headlamps 10L, 10R (S47), and this routine is terminated. Thus, the state of beams from the headlamps 10L, 10R is changed from the low beam state to the high beam state.

When it is determined at S46 that the previous light source position is not right forward or the road is not curved to the left (S46: No), it is determined whether or not the previous light source position is left forward and the road is curved to the right (S48). This determination is carried out based on the previous light source position information stored in the RAM 23 and road information from the automobile navigation system 30. When the previous light source position is left forward and the road is curved to the right (S48: Yes), a beam switching signal for changing the beam state to the high beam state is outputted to the headlamps 10L, 10R (S49), and this routine is terminated. Thus, the state of beams from the headlamps 10L, 10R is changed from the low beam state to the high beam state.

This routine is terminated without outputting a beam switching signal when it is determined at S45 that a light source did not exist ahead at the previous time (S45: No), and when it is determined at S48 that the previous light source position is not left forward or the road is not curved to the right (S48: No). In these cases, the present state of beam is maintained.

When it is determined at S44 that the road is not curved ahead (S44: No), a beam switching signal for changing the beam state to the high beam state is outputted to the headlamps 10L, 10R (S50), and this routine is terminated. Thus, the state of beams from the headlamps 10L, 10R is changed from the low beam state to the high beam state.

When the determination at S45 in the flowchart in FIG. 8 is "No" and when the determinations at S46 and at S48 are both "No," that corresponds to the specific state in the invention in which change of the state of projection of light from the headlamps should be prohibited.

According to this embodiment, as is apparent from the above detailed description, the following is implemented on a road in which a right curve exists ahead of a straight section. When the reference vehicle 90 is running in a straight section of such a road and the forward vehicle 91 enters the right curve ahead, as illustrated in the bird's-eye view in FIG. 13, the forward vehicle 91 can temporarily get out of the range of detection of the imaging sensor 19. The headlamps 10L, 10R are kept in the present state of beam at this time. Therefore, it is possible to prevent unnecessary change of the state of beam that can distract the driver of the forward vehicle 91.

Also, when the reference vehicle 90 is turning, following the forward vehicle 91 on such a curved road as illustrated in FIG. 12A, the headlamps 10L, 10R are kept in the present state of projection as in the second embodiment. Thus, unnecessary change of the state of beam can be prevented.

Like the previous embodiments, the headlamps 10L, 10R are maintained in the present projection state (i.e., low beam state) when the specific state exists. In this embodiment, it is determined that the present state is the specific state when the absence of a forward light source is detected, but the presence of a forward vehicle 91 is stored as the previous light source detection information in the RAM 23, and the direction of the curve ahead on the road and the side position of the forward vehicle 91 stored as the previous light source detection information in the RAM 23 agree with each other.

The above processing allows the situations illustrated in FIGS. 12A and 12B to be discriminated from each other. In cases in which the forward vehicle 91 turns to the left or right at a junction and gets out of the range of detection of the imaging sensor 19 (FIG. 12B), the projection state would be changed from low to high beam states. On the other hand, in cases where the forward vehicle 91 running through a curve temporarily moves out of the range of detection of the imaging sensor 19 (FIG. 12A), the projection state would remain in the low beam state. (FIG. 12B illustrates a case where the forward vehicle 91 turns to the left at a junction in a right curve (S48: Yes), and the state of beams from the headlamps 10L, 10R is changed from the low beam state to the high beam state.)

Figure 9:
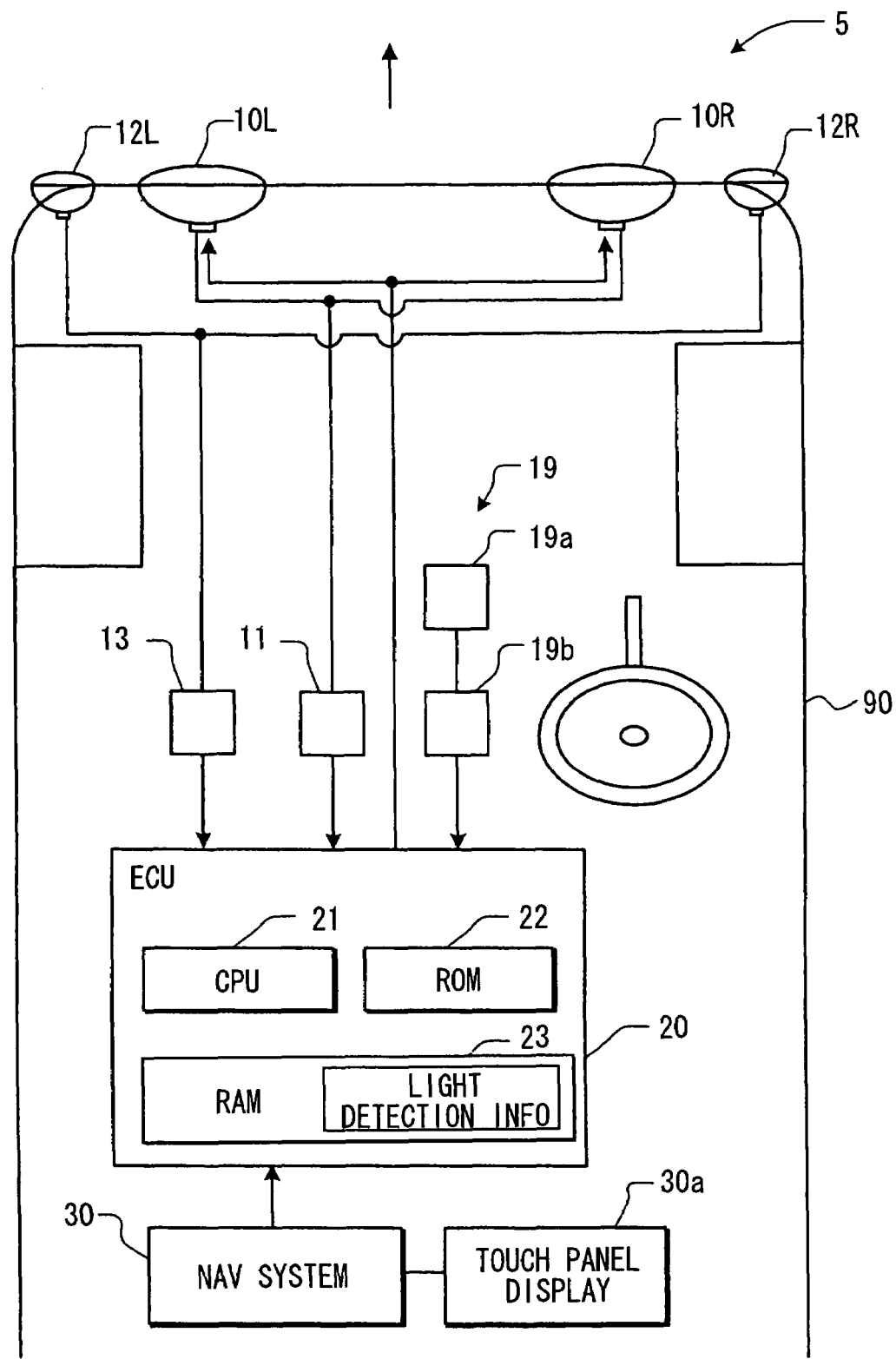
FIG. 9 is a block diagram illustrating the system configuration of a vehicle headlamp device in a fifth embodiment.
Figure 10:
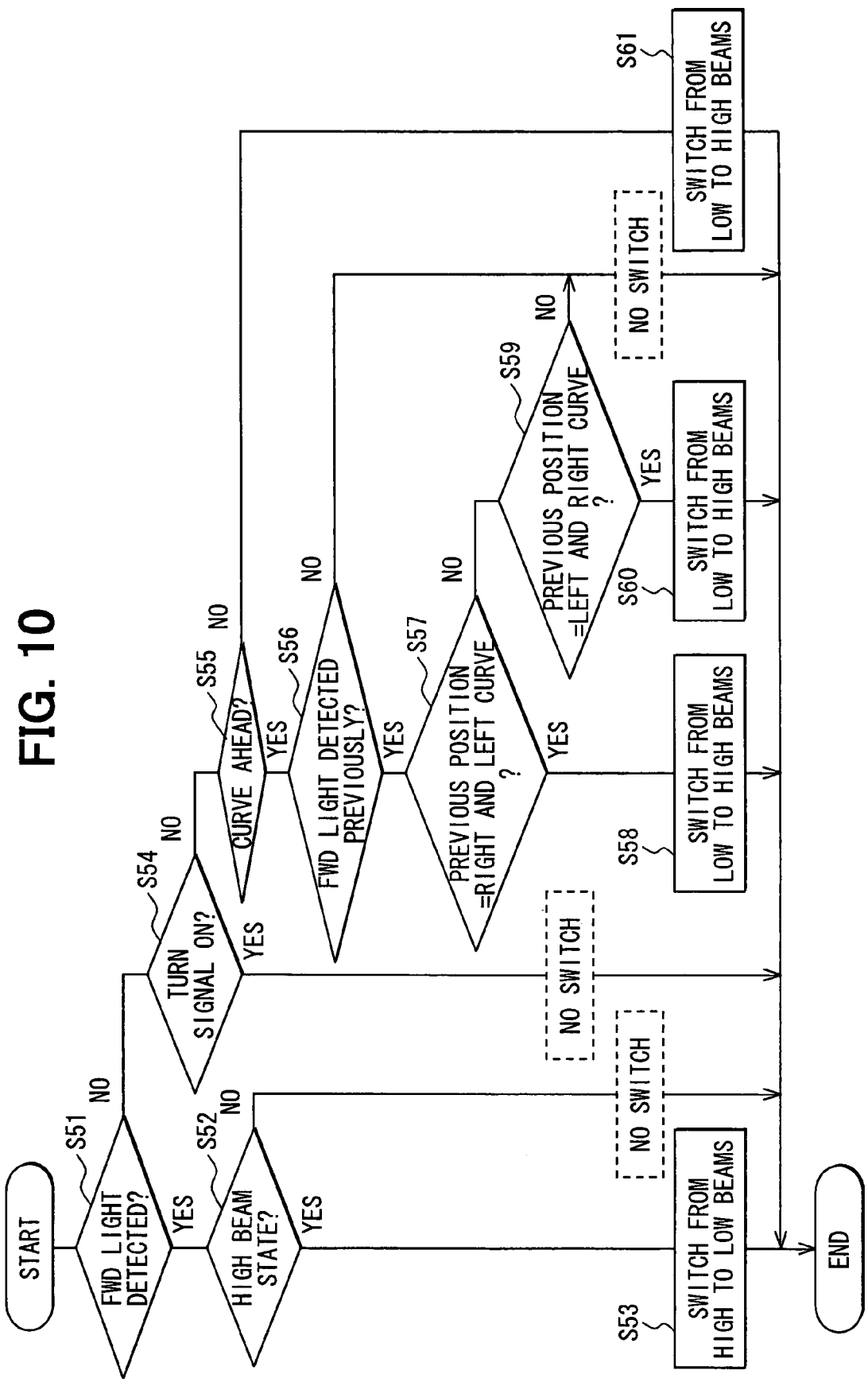
FIG. 10 is a flowchart illustrating the process flow of the beam state change processing in the vehicle headlamp device of the fifth embodiment.

Description will be given to a fifth embodiment of the invention with reference to FIG. 9 and FIG. 10. FIG. 9 is a block diagram illustrating the system configuration of a vehicle headlamp device 5 in the fifth embodiment. FIG. 10 is a flowchart illustrating the flow of the beam state change processing in the vehicle headlamp device 5. This embodiment is so constructed that the state of beam is determined and changed by a combination of the first embodiment and the fourth embodiment.

As illustrated in FIG. 9, the ECU 20 of the vehicle headlamp device 5 is inputted with output signals from the headlamp switch 11, turn signal lamp switch 13, imaging sensor 19, and automobile navigation system 30.

The steps from S51 to S53 in the flowchart in FIG. 10 are the same as the steps from S1 to S3 in the flowchart in FIG. 2; therefore, the description of them will be omitted.

When it is determined at S51 that there is the input of a light source absent signal, that is, a light source does not exist ahead (S51: No), it is determined based on a signal from the turn signal lamp switch 13 whether or not the left turn signal lamp 12L or the right turn signal lamp 12R is on (S54). When it is determined that there is the input of a left on signal or right on signal, that is, the left turn signal lamp 12L or the right turn signal lamp 12R is on (S54: Yes), this routine is terminated without outputting a beam switching signal. In this case, the present state of beam is maintained.

When it is determined at S54 that there is no input of a left on signal or a right on signal, that is, neither the left turn signal lamp 12L nor the right turn signal lamp 12R is on (S54: No), the flow proceeds to S55. The steps from S55 to S61 are the same as the steps from S44 to S50 in the flowchart in FIG. 8; therefore, the description of them will be omitted.

When the determination at S54 in the flowchart in FIG. 10 is "Yes," when the determination at S56 is "No," and when the determinations at S57 and at S59 are both "No," that corresponds to the specific state in the invention in which change of the state of projection of light from the headlamps should be prohibited.

Figure 13:
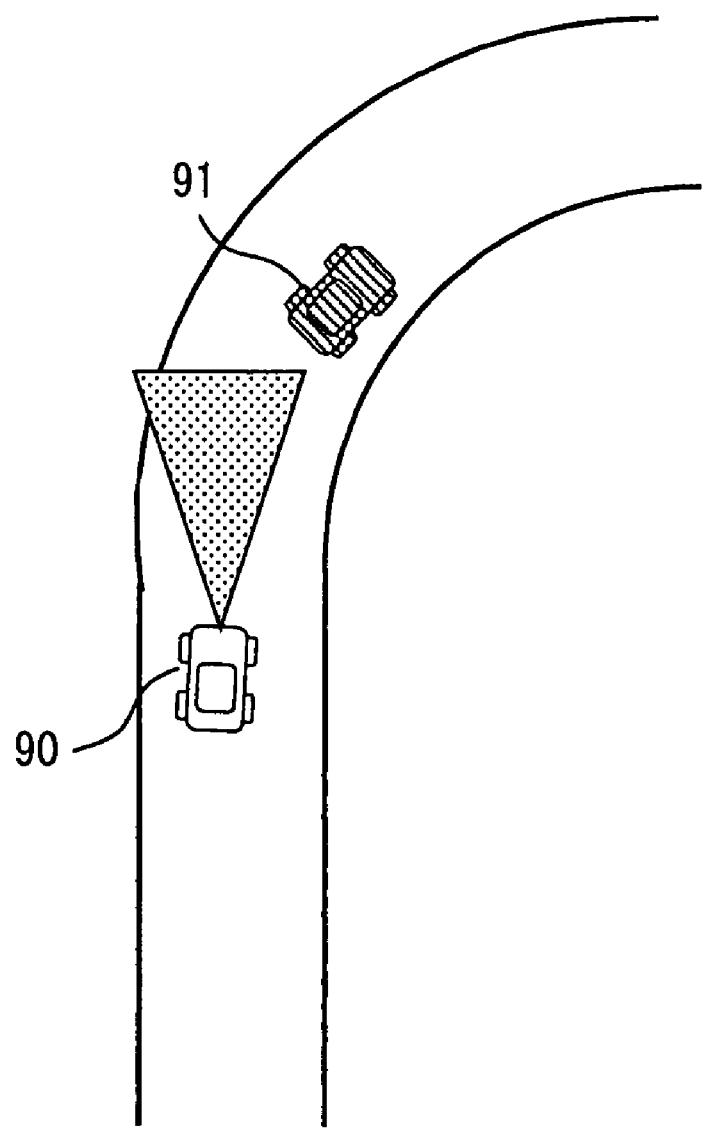
FIG. 13 is an overhead view schematically illustrating a case where the forward vehicle enters a curve existing ahead of a straight section of road.

According to this embodiment, as is apparent from the above detailed description, it is possible to prevent unnecessary change of the state of beams from the headlamps 10L, 10R when the reference vehicle 90 turns to the left or right, as illustrated in FIG. 11, when the reference vehicle 90 turns, following the forward vehicle 91, on a curved road, as illustrated in FIG. 12A, and when the reference vehicle 90 follows the forward vehicle 91 on a road in which a curve exists ahead of a straight section, as illustrated in FIG. 13.

The disclosure is not limited to the above-mentioned embodiments, and can be modified in various manners without departing from the scope of the disclosure. Some examples will be given.

In the description of the above embodiments, cases where the headlamps 10L, 10R are constructed of lamps having a filament for low beam and a filament for high beam are taken as examples. The disclosure is not limited to this construction. For example, the disclosure may be so constructed that the headlamps 10L, 10R are constructed of a large number of LEDs (Light Emitting Diodes) and an amount of light projected is increased or decreased by varying the lighting pattern (the number of LEDs to be lighted up, their positions, etc.) of the LEDs.

The second embodiment and the third embodiment are so constructed that it is detected based on a steering angle signal outputted from the steering angle sensor that the reference vehicle 90 is turning. Instead, in one embodiment shown in FIG. 5, turning is detected based on yaw angle information from a yaw angle sensor 92 instead of or in addition to steering angle information from the steering angle sensor 15. The yaw angle sensor 92 detects a yaw angle of the reference vehicle 90 to determine that the reference vehicle 90 is turning.

Furthermore, in another embodiment, turning of the reference vehicle 90 is detected based on road information from an automobile navigation system 30 such that it is detected whether the reference vehicle 90 is running in a curved section of a road and it is thereby detected that the reference vehicle 90 is turning.

While only the selected example embodiments have been chosen to illustrate the present disclosure it will be apparent to those skilled in the art from this disclosure that various changes and modifications can be made therein without departing from the scope of the disclosure as defined in the appended claims. Furthermore, the foregoing description of the example embodiments according to the present disclosure is provided for illustration only, and not for the purpose of limiting the disclosure as defined by the appended claims and their equivalents.

What is claimed is:

1. A vehicle headlamp device for a reference vehicle with a headlamp comprising:
   a forward vehicle detecting device for detecting the presence of a forward vehicle;
   a projection state changing device for switching a projection state of the headlamp between a first projection state and a second projection state, wherein the headlamp projects a greater amount of light in the second projection state than in the first projection state, and wherein the projection state changing device switches the headlamp to the first projection state when the forward vehicle detecting device detects the presence of the forward vehicle, and wherein the projection state changing device switches the headlamp to the second projection state when the forward vehicle detecting device detects an absence of the forward vehicle; and
   a specific state determining device that determines whether a specific state exists in which switching between the first and second projection states should be prohibited, wherein the projection state changing device maintains the headlamp in a current state of projection when the specific state determining device determines that the specific state exists.

2. The vehicle headlamp device of claim 1, wherein the specific state determining device determines that the specific state exists when it is detected that a turn signal lamp of the vehicle is on.

3. The vehicle headlamp device of claim 1, wherein the specific state determining device determines that the specific state exists when it is detected that the vehicle is turning.

4. The vehicle headlamp device of claim 3, further comprising a steering angle sensor for detecting a steering angle of the vehicle, and wherein it is detected that the vehicle is turning based on a steering angle detected by the steering angle sensor.

5. The vehicle headlamp device of claim 3, further comprising a yaw angle sensor for detecting a yaw angle of the vehicle, and wherein it is detected that the reference vehicle is turning based on a yaw angle detected by the yaw angle sensor.

6. The vehicle headlamp device of claim 3, further comprising a vehicle navigation system, and wherein it is detected that the reference vehicle is turning based on road information from the vehicle navigation system.

7. The vehicle headlamp device of any of claim 3,
   wherein the forward vehicle detecting device is further operable for detecting a side position of the forward vehicle relative to the reference vehicle;
   further comprising a detection result storing device for storing the presence and absence of the forward vehicle for a previous detection and for storing the side position of the forward vehicle for the previous detection; and
   wherein the specific state determining device determines that the specific state exists when:
      an absence of the forward vehicle is detected, but the presence of the forward vehicle is stored for a previous detection in the detection result storing device, and
      a turning direction and the side position stored for the previous detection in the detection result storing device agree with each other.

8. The vehicle headlamp device of claim 1, wherein the specific state determining device determines that the specific state exists when it is detected that a curve exists ahead of the reference vehicle.

9. The vehicle headlamp device of claim 8, wherein the specific state determining device detects the curve ahead of the reference vehicle based on road information from a vehicle navigation system.

10. The vehicle headlamp device of claim 8,
   wherein the forward vehicle detecting device is further operable for detecting a side position of the forward vehicle relative to the reference vehicle;
   further comprising a detection result storing device for storing the presence and absence of the forward vehicle and for storing the side position of the forward vehicle detected by the forward vehicle detecting device; and
   wherein the specific state determining device determines that the specific state exists when:
      an absence of the forward vehicle is detected, but the presence of the forward vehicle is stored for a previous detection in the detection result storing device, and
      a turning direction of the curve ahead of the relevant vehicle and the side position stored for the previous detection in the detection result storing device agree with each other.

* * * * *